United States Patent
Shinn et al.

(10) Patent No.: US 7,595,928 B1
(45) Date of Patent: Sep. 29, 2009

(54) METHOD AND APPARATUS FOR MANUFACTURING ELECTROPHORETIC DISPLAY

(75) Inventors: Ted-Hong Shinn, Hsinchu (TW);
Hsiang-Tang Wang, Hsinchu (TW);
Yi-Ching Wang, Hsinchu (TW);
Wen-Shin Liu, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 50 days.

(21) Appl. No.: 12/101,178

(22) Filed: Apr. 11, 2008

(30) Foreign Application Priority Data

Jan. 8, 2008 (TW) .............................. 97100747 A

(51) Int. Cl.
*G02B 26/00* (2006.01)
*G09G 3/34* (2006.01)
*G03G 17/04* (2006.01)
(52) U.S. Cl. .......................... 359/296; 345/107; 430/32
(58) Field of Classification Search ................. 359/296; 345/107; 430/32; 204/600
See application file for complete search history.

(56) References Cited

U.S. PATENT DOCUMENTS

2006/0220541 A1\* 10/2006 Koyama ..................... 313/506

\* cited by examiner

*Primary Examiner*—William C Choi
(74) *Attorney, Agent, or Firm*—Chun-Ming Shih

(57) ABSTRACT

In an apparatus for manufacturing an electrophoretic display, the electrophoretic display includes a backside plate having a cover area and a display structure. The display structure is arranged on the backside plate and a rear surface thereof facing toward the backside plate has an area less than the cover area. The apparatus includes a main body and a pressure-supplying member. The main body includes a receiving cavity, a supporting surface and a plurality of absorption holes. The receiving cavity is configured to receive the display structure therein. The supporting surface is located at the bottom of the receiving cavity. The absorption holes are arranged at the bottom of the receiving cavity and each penetrates through the supporting surface. The absorption holes are configured to vacuum absorb the display structure on the supporting surface via vacuum absorption means. The pressure-supplying member is configured to apply a pressure onto the backside plate so as to stack the backside plate on the rear surface of the display structure. The present invention also provides a method for manufacturing an electrophoretic display.

20 Claims, 3 Drawing Sheets

METHOD AND APPARATUS FOR MANUFACTURING ELECTROPHORETIC DISPLAY

BACKGROUND

The invention is related to a manufacture of a reflective display device, especially to a method and an apparatus for manufacturing an electrophoretic display.

An electrophoretic display (EPD) is a reflective display device based on utilizing the electrophoretic effect of the electriferous particles dispersed in a dielectric solvent. Conventional EPD includes a glass substrate, a transparent protection layer opposite to the glass substrate with an interval, and an electrophoretic layer sandwiched between the glass substrate and the transparent protection layer. The electrophoretic display is divided into a passive matrix drive type and an active matrix drive type by driving mode. For a passive matrix drive type electrophoretic display, it is necessary to form row electrodes and transparent column electrodes on the glass substrate and transparent protection layer. Correspondingly, for an active matrix drive type electrophoretic display, a thin film transistor (TFT) matrix and pixel electrode are needed to be disposed on the glass substrate and a transparent plate electrode without pattern is needed to be disposed on the transparent protection layer.

Along with a widely used of the electrophoretic display and mostly used on portable devices, it becomes more important to design light-weight and thin-thickness electrophoretic displays. At the present time, a soft electrophoretic display using a flexible plate to replace the glass substrate is respected to be an apparatus which can own all virtues described above and became primary products of the market in future. However, how to improve the manufacturing yield rate and keep preferable reliability as much should be solved desirously.

BRIEF SUMMARY

The present invention is directed to provide an apparatus of manufacturing electrophoretic display, which can increase the manufacturing yield and improve the electrophoretic display reliability to achieve product commerce.

The present invention is directed to provide a method for manufacturing electrophoretic display, which can increase the manufacturing yield and improve the electrophoretic display reliability to achieve product commerce.

According to an embodiment of the present invention, an apparatus of manufacturing an electrophoretic display is provided. The electrophoretic display includes a backside plate including a cover area and a display structure disposed on the backside plate, the backside plate has an area less than the cover area; the apparatus includes:

a main body including:
a receiving cavity containing the display structure;
a supporting surface disposed on the bottom side of the receiving cavity; and
a plurality of absorption holes disposed on the bottom side of the receiving cavity to penetrate the main body, the absorption holes are used to absorb the display structure on the supporting surface via a vacuum absorption means; and
a pressure-supplying member, used to provide a pressure to the backside plate and make the backside plate stacked on the surface of the display structure.

According to another embodiment of the present invention, a method of manufacturing an electrophoretic display is provided an apparatus of manufacturing an electrophoretic display includes:

a main body including:
a receiving cavity to contain a display structure;
a supporting surface disposed on the bottom side of the receiving cavity; and
a plurality of absorption holes disposed on the bottom side of the receiving cavity to penetrate the main body;
the method includes the steps of:
providing a display structure including a surface;
disposing the display structure in the receiving cavity and making the surface being not opposite to the supporting surface;
forming the display structure on the supporting surface via a vacuum absorption means by the absorption holes;
making the backside plate stacked on the surface of the display structure, the backside plate includes a cover area larger than the surface of the display structure; and
removing the vacuum absorption.

According to the embodiments of the invention, the method and apparatus for manufacturing an electrophoretic display is apt to manufacture an electrophoretic display with a large display structure of a backside plate. The backside plate can improve the electrophoretic display reliability to achieve product commerce.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
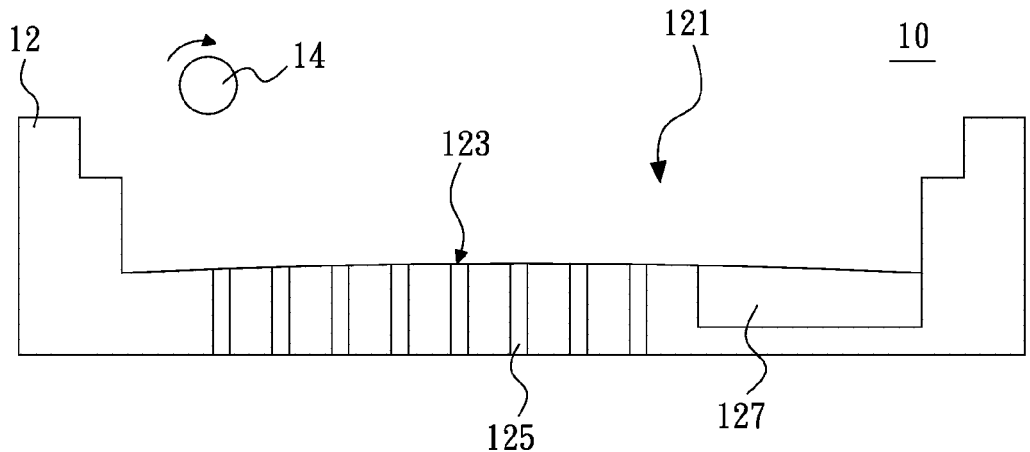
FIG. 1 is a cross sectional, schematic view of an apparatus for manufacturing an electrophoretic display according to an embodiment of the present invention.
Figure 2:
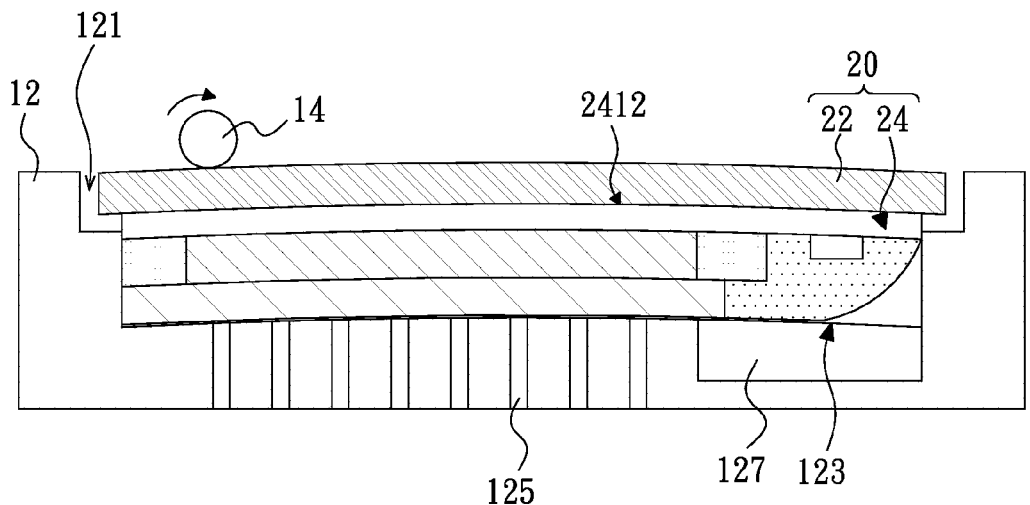
FIG. 2 is a working status view of the apparatus of FIG. 1.
Figure 3:
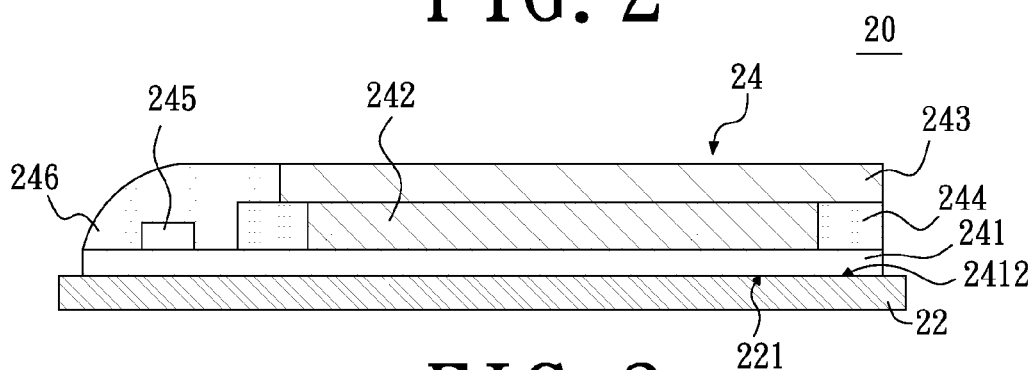
FIG. 3 is a cross sectional, schematic view of an electrophoretic layer.

Referring to FIG. 1 to FIG. 3, an apparatus 10 for manufacturing an electrophoretic display 20 of FIG. 3 is provided according to an embodiment of the present invention.

As shown in FIG. 3, the electrophoretic display 20 includes a backside plate 22 and a display structure 24.

The backside plate 22 includes a surface 221 with a cover area. The backside plate 22 is made of flexible material, such as polyethylene terephthalate (PET), polystyrene (PS), or polycarbonate (PC). Preferably, the backside plate 22 is transparent, so that the display structure 24 is apt to electric detection including microscope analysis and observation.

The display structure 24 is disposed on the backside plate 22, including a surface 2412 facing to the backside plate 22. The 2412 has an area smaller than the cover area. Preferably, an interval between the display structure 24 and the backside plate 22 is in a range of 0.1 mm to 1 mm.

Illuminated in detail, the display structure 24 includes a flexible plate 241, an electrophoretic layer 242, a transparent protection layer 243, an edge protection member 244, a driving integrated circuit (IC) 245, and an edge reinforcement member 246.

The flexible plate 241 is disposed on the surface 221 of the backside plate 22. The required circuits and a first driving electrode (not shown) are disposed on the flexible plate 241. The material of the flexible plate 241 can be polyimide (PI), polyethylene terephthalate (PET), polyethersulfone (PES), or polycarbonate (PC).

The electrophoretic layer 242 is disposed on the flexible plate 241. The electrophoretic layer 242 includes a dielectric solvent and electriferous particles dispersed in the dielectric solvent.

The edge protection member 244 surrounds the electrophoretic layer 242. The material of the edge protection member 244 can be resin material, such as Phenoxy Resin.

The transparent protection layer 243 is disposed on the electrophoretic layer 242 and the edge protection member 244, including a second driving electrode (not shown). The second driving electrode is a transparent electrode, such as an Indium Tin Oxide (ITO) electrode. Illuminated in detail, when a passive matrix drive type electrophoretic display 20 is manufactured, the first driving electrode on the flexible plate 241 and the second driving electrode on the transparent protection layer 243 are row electrode and transparent column electrode respectively. On the contrary, to an active matrix drive type electrophoretic display 20, the first driving electrode on the flexible plate 241 and the second driving electrode are pixel electrode and transparent plate electrode without pattern, respectively, and an active device matrix, such as a thin film transistor (TFT) matrix, is arranged on the flexible plate 241 to electrically connect to the pixel electrode.

The driving IC 245 in juxtaposition with the electrophoretic layer 242 are disposed on the flexible plate 241 to connect electrically to the circuits and the first driving electrode on the flexible plate 241. The driving IC 245 can be a chip on glass (COG) module. Of course, the driving IC 245 is not limited to be disposed on the flexible plate 241, and also can be a driving control module (not shown) independent to the display structure 24.

The edge reinforcement member 246 covers the driving IC 245 and connects to the transparent protection layer 243 to protect the driving IC 245. The material of the edge reinforcement member 246 can be plastic material, such as UV polymeric gel, silica gel, or polyurethane (PU).

As shown in FIG. 1 and FIG. 2, an apparatus 10 for manufacturing an electrophoretic display includes a main body 12 and a pressure-supplying member 14.

The main body 12 includes a receiving cavity 121, a supporting surface 123, a plurality of absorption holes 125, and a groove 127.

The receiving cavity 121 contains the display structure 24 of the electrophoretic display 20, and the receiving cavity 121 is a stepladder-like slot which has a depth more than the thickness of the display structure 24.

The supporting surface 123 is formed on a bottom side of the receiving cavity 121. Preferably, the supporting surface 123 has an arc shape raised outside along a normal direction of the supporting surface 123 (not shown). When the electrophoretic display 20 is absorbed by the supporting surface 123, due to the arc shape, the central part would stick up slightly which can reduce air bubble generated between the backside plate 22 and the display structure 24 when the backside plate 22 are stacked on the display structure 24, and also improve the yield rate of the electrophoretic display 20.

The absorption holes 125 are formed on the supporting surface 123 to penetrate the main body 12. The absorption holes 125 are used to absorb the display structure 24 on the supporting surface 123 via a vacuum absorption means.

The groove 127 and the receiving cavity 121 are connected structure and the absorption holes 125 are formed on the supporting surface 123. The position of the groove 127 is corresponding to the driving IC 245 of the display structure 24 (as shown in FIG. 2). The groove 127 can avoid the driving IC 245 breaking when the backside plate 22 are stacked on the display structure 24.

The pressure-supplying member 14 is used to provide a pressure to a backside plate 22 for making the backside plate 22 stacked on the surface 2412 of the display structure 24. According to the embodiment, the pressure-supplying member 14 is a roller. Of course, the pressure-supplying member 14 can be other pressure-supplying devices to provide a pressure for making the backside plate 22 stacked on the display structure 24.

Figure 4:
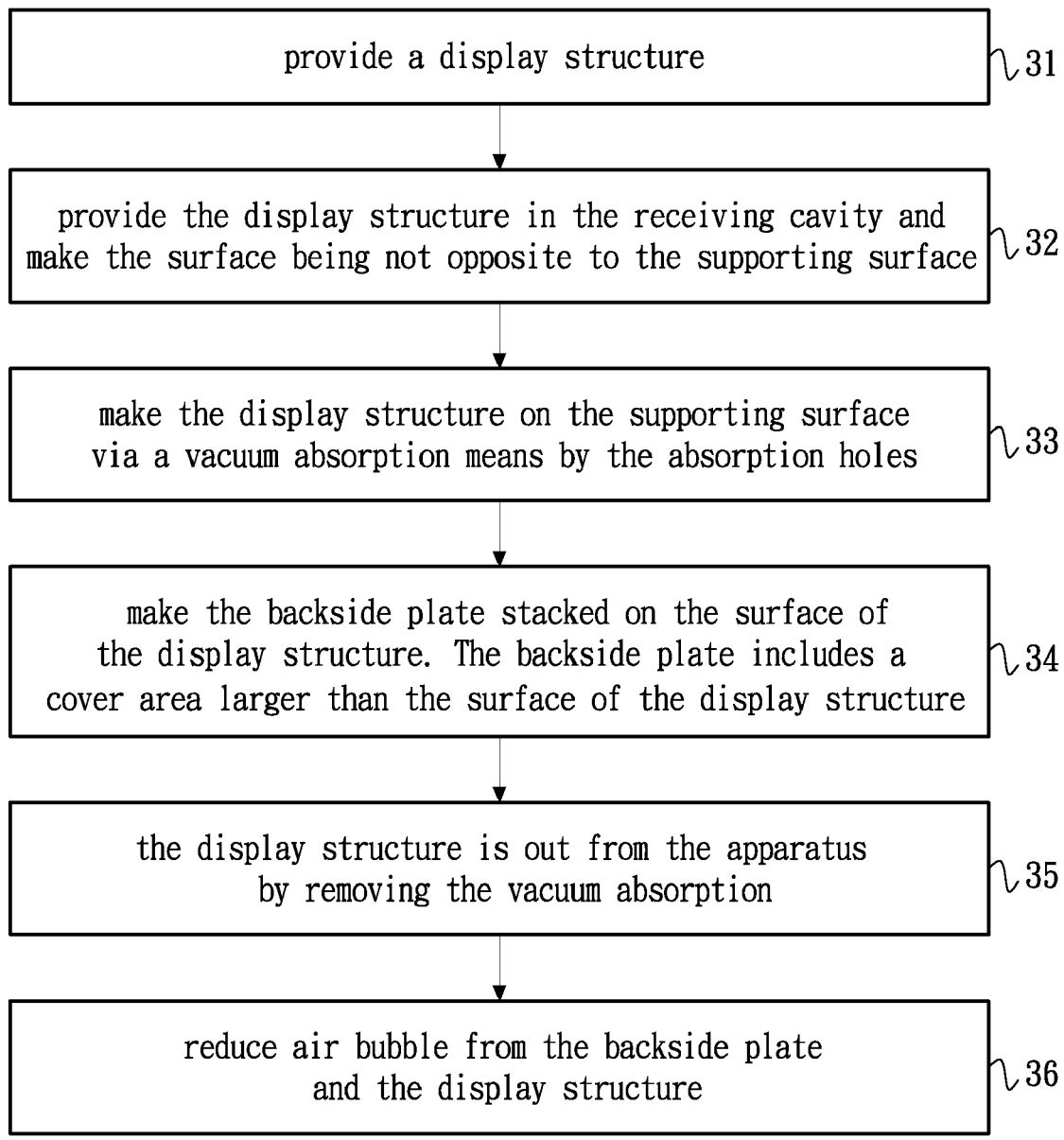
FIG. 4 is a flow chart of a method for manufacturing an electrophoretic display according to an embodiment of the present invention.
Figure 5:
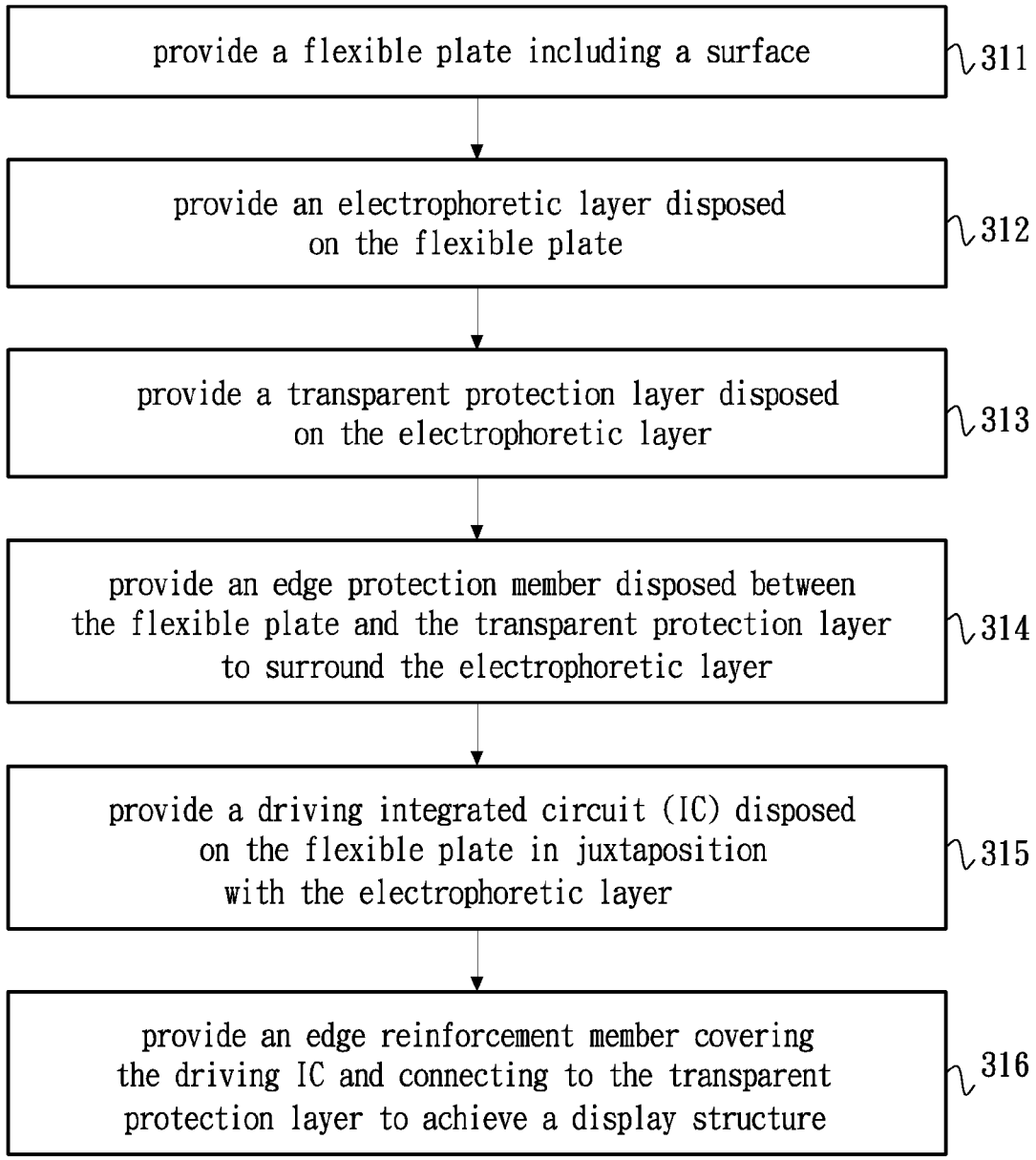
FIG. 5 is a flow chart of sub-steps of the method for manufacturing an electrophoretic display.

As shown in FIG. 2 to FIG. 5, a method of manufacturing an electrophoretic display using the above apparatus 10 includes step 31 to step 36 of FIG. 4:

step 31: providing a display structure 24, referring to FIG. 2 to FIG. 5, the step 31 includes the step 311 to step 316:

step 311: providing a flexible plate 241 including a surface 2412;

step 312: providing an electrophoretic layer 242 disposed on the flexible plate 241;

step 313: providing a transparent protection layer 243 disposed on the electrophoretic layer 242;

step 314: providing an edge protection member 244 disposed between the flexible plate 241 and the transparent protection layer 243 to surround the electrophoretic layer 242;

step 315: providing a driving integrated circuit (IC) 245 disposed on the flexible plate 241 in juxtaposition with the electrophoretic layer 242; and step 316: providing an edge reinforcement member 246 covering the driving IC 245 and connecting to the transparent protection layer 243 to achieve a display structure 24.

step 32: providing the display structure 24 in the receiving cavity 121 and making the surface 2412 being not opposite to the supporting surface 123 (shown in FIG. 2); positioning the driving IC 245 of the display structure 24 corresponding to the groove 127;

step 33: making the display structure 24 on the supporting surface 123 via a vacuum absorption means by the absorption holes 125;

step 34: making the backside plate 22 stacked on the surface 2412 of the display structure 24. The backside plate 22 includes a cover area larger than the surface 2412 of the display structure 24. The cover area is a corresponding area of the backside plate 22 facing to the surface 2412 of the display structure 24. The backside plate 22 adheres to the surface 2412 of the display structure 24. The backside plate 22 can adhere to the surface 2412 of the display structure 24 directly, or adhere to the display structure 24 by an adhering layer (not shown).

Further, the step of making the backside plate 22 stacked on the surface 2412 of the display structure 24 can include steps of: positioning the backside plate 22 to make an interval between the display structure 14 and the backside plate 12 to be in a range of 0.1 mm to 1 mm; the pressure-supplying member 14, such as a roller, provides a pressure on the backside plate 22 to make the backside plate 22 stacked on the surface 2412 of the display structure 24. The pressure is in a range of 0.25 to 0.4 mPa.

step 35: forming the backside plate 22 and the display structure 24 out from the apparatus 10 by removing the vacuum absorption. The backside plate 22 and the display structure 24 form an electrophoretic display 20.

step 36: reducing air bubble from the backside plate 22 and the display structure 24. A pressure of reducing air bubble is in a range of 5 to 8.5 Kgf/$cm^2$, and a temperature of reducing air bubble is in a range of 40 to 70° C., and the time of reducing air bubble is in a range of 10 minutes to 2 hours. Of course, the pressure, temperature or time of reducing air bubble can be changed according to actual requirement. According to the present embodiment, reducing air bubble by high pressure can reduce air bubble generated between the backside plate 22 and the display structure 24 during the backside plate 22 stacked on the display structure 24, and also improve the yield rate of the electrophoretic display 20.

As described above, according to the embodiments of the invention, the method and apparatus for manufacturing an electrophoretic display is apt to manufacture an electrophoretic display with a large display structure of a backside plate. The backside plate can improve the electrophoretic display reliability to achieve product commerce.

What is claimed is:

1. An apparatus for manufacturing an electrophoretic display, wherein the electrophoretic display comprises a backside plate including a cover area and a display structure disposed on the backside plate, and the display structure having a surface facing toward the backside plate with an area less than the cover area, the apparatus comprising: a main body including: a receiving cavity for containing the display structure; a supporting surface formed on a bottom side of the receiving cavity; and a plurality of absorption holes formed on the supporting surface to penetrate the main body, through which the display structure is fixed on the supporting surface via a vacuum absorption means; and a pressure supplying member, used to provide a pressure to the backside plate and to make the backside plate stacked on the surface of the display structure.

2. An apparatus for manufacturing an electrophoretic display according to claim 1, wherein the display structure comprises: a flexible plate disposed on the backside plate; an electrophoretic layer disposed on the flexible plate; an edge protection member surrounding the electrophoretic layer; a transparent protection layer disposed on the electrophoretic layer and the edge protection member; a driving integrated circuit (IC) disposed on the flexible plate in juxtaposition with the electrophoretic layer; and an edge reinforcement member covering the driving IC and connected to the transparent protection layer.

3. An apparatus for manufacturing an electrophoretic display according to claim 2, wherein the main body comprises a groove, and the groove and the receiving cavity are a connected structure and the absorption holes are disposed on the bottom side of the receiving cavity, and the position of the groove corresponds to the driving IC of the display structure.

4. An apparatus for manufacturing an electrophoretic display according to claim 1, wherein the receiving cavity has a shape of a stepladder slot.

5. An apparatus for manufacturing an electrophoretic display according to claim 1, wherein the supporting surface has an arc shape raised outside along a normal direction of the supporting surface.

6. An apparatus for manufacturing an electrophoretic display according to claim 1, wherein the main body comprises a groove, and the groove and the receiving cavity are a connected structure and the absorption holes are disposed on bottom side of the receiving cavity.

7. An apparatus for manufacturing an electrophoretic display according to claim 1, wherein the pressure-supplying member is a roller.

8. A method of manufacturing an electrophoretic display using an apparatus comprising: a main body comprising: a receiving cavity containing the display structure; a supporting surface disposed on the bottom side of the receiving cavity; and a plurality of absorption holes disposed on the bottom side of the receiving cavity and penetrating the main body; the method comprising steps of: providing a display structure comprising a surface; disposing the display structure in the receiving cavity with the surface being not opposite to the supporting surface; holding the display structure on the supporting surface via a vacuum absorption means by the absorption holes; forming the backside plate stacked on the surface of the display structure, the backside plate comprising a cover area larger than the surface of the display structure; and removing the vacuum absorption.

9. A method of manufacturing an electrophoretic display according to claim 8, wherein the apparatus further comprises a pressure-supplying member, and the method further comprises the step of: providing a pressure on the backside plate.

10. A method of manufacturing an electrophoretic display according to claim 9, wherein the pressure is in a range of 0.25 to 0.4 mPa.

11. A method of manufacturing an electrophoretic display according to claim 8, wherein the method further comprises the step of reducing air bubbles from the backside plate and the display structure.

12. A method of manufacturing an electrophoretic display according to claim 11, wherein the pressure of reducing air bubbles is in a range of 5 to 8.5 Kgf/cm$^2$, the temperature of reducing air bubbles is in a range of 40 to 70° C., and the time of reducing air bubbles is in a range of 10 minutes to 2 hours.

13. A method of manufacturing an electrophoretic display according to claim 8, wherein the step of providing a display structure comprises: providing a flexible plate; providing an electrophoretic layer disposed on the flexible plate, a surface of the display structure being the surface of the flexible plate without the electrophoretic layer; providing a transparent protection layer disposed on the electrophoretic layer; and providing an edge protection member disposed between the flexible plate and the transparent protection layer to surround the electrophoretic layer.

14. A method of manufacturing an electrophoretic display according to claim 13, wherein the material of the flexible plate is polyimide (PI), polyethylene terephthalate (PET), polyethersulfone (PES), or polycarbonate (PC).

15. A method of manufacturing an electrophoretic display according to claim 13, wherein the method further comprises a step after the step of providing the edge protection member comprising: providing a driving IC disposed on the flexible plate in juxtaposition with the electrophoretic layer; and an edge protection member to cover the driving IC and to connect to the transparent protection layer.

16. A method of manufacturing an electrophoretic display according to claim 15, wherein the driving IC is a chip on glass (COG) module.

17. A method of manufacturing an electrophoretic display according to claim 15, wherein the main body comprises a groove, and the groove and the receiving cavity are a connected structure and the absorption holes are disposed on bottom side of the receiving cavity, and the position of the groove corresponds to the driving IC of the display structure.

18. A method of manufacturing an electrophoretic display according to claim 8, wherein the backside plate adheres to the surface of the display structure.

19. A method of manufacturing an electrophoretic display according to claim 8, wherein the backside plate is transparent.

20. A method of manufacturing an electrophoretic display according to claim 8, wherein the supporting surface has an arc shape raised outside along a normal direction of the supporting surface.

* * * * *